United States Patent
Mityagin

(10) Patent No.: US 11,372,990 B2
(45) Date of Patent: *Jun. 28, 2022

(54) RESTRICTING ACCESS TO CONTENT

(71) Applicant: Dropbox, Inc., San Francisco, CA (US)

(72) Inventor: Anton Mityagin, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 15/801,900

(22) Filed: Nov. 2, 2017

(65) Prior Publication Data

US 2018/0121672 A1 May 3, 2018

Related U.S. Application Data

(63) Continuation of application No. 14/139,469, filed on Dec. 23, 2013, now Pat. No. 9,817,987.

(51) Int. Cl.
*G06F 16/00* (2019.01)
*G06F 21/62* (2013.01)
*H04L 67/10* (2022.01)
*H04L 67/1095* (2022.01)
*H04L 9/40* (2022.01)

(52) U.S. Cl.
CPC ........ *G06F 21/6218* (2013.01); *H04L 63/105* (2013.01); *H04L 67/10* (2013.01); *H04L 67/1095* (2013.01); *H04L 63/0876* (2013.01)

(58) Field of Classification Search
CPC ..... G06F 2221/2141; G06F 2221/2149; G06F 21/50; G06F 21/335; G06F 21/6245; H04L 63/10; H04L 63/083; H04L 63/107; H04L 67/22
See application file for complete search history.

(56) References Cited

U.S. PATENT DOCUMENTS

| | | | |
|---|---|---|---|
| 8,555,403 B1 | 10/2013 | Kilday | |
| 8,606,656 B1 | 12/2013 | Franklin et al. | |
| 8,893,299 B1 * | 11/2014 | Diamond | G06F 21/10 726/28 |
| 2002/0198609 A1 | 12/2002 | Baron | |
| 2003/0051169 A1 * | 3/2003 | Sprigg | H04W 12/0023 726/4 |

(Continued)

FOREIGN PATENT DOCUMENTS

| | | | | |
|---|---|---|---|---|
| CA | 3043599 A1 * | 8/2012 | ........... | H04L 65/403 |
| WO | 02/03167 A2 | 1/2002 | | |

(Continued)

*Primary Examiner* — Augustine K. Obisesan
(74) *Attorney, Agent, or Firm* — Polsinelli PC

(57) ABSTRACT

Various embodiments restrict or enable access to content items of an account based on login information or content request properties. For example, a synchronized online content management system can receive a request including one or more content request properties from a client device to access a user account. Access rules for the user account can be obtained and applied based on the content request properties to generate an access status. In one instance, the client device is provided with full account access if the access status indicates that the client device is an authorized device. In another instance, if the client device is an unauthorized device, at least one aspect of access to the user account is restricted.

22 Claims, 9 Drawing Sheets

(56) References Cited

U.S. PATENT DOCUMENTS

| | | |
|---|---|---|
| 2003/0115344 A1 | 6/2003 | Tang et al. |
| 2004/0006594 A1 | 1/2004 | Boyer et al. |
| 2004/0210755 A1 | 10/2004 | Becker et al. |
| 2004/0225968 A1 | 11/2004 | Look et al. |
| 2004/0243832 A1 | 12/2004 | Wilf et al. |
| 2005/0015592 A1 | 1/2005 | Lin |
| 2005/0022229 A1 | 1/2005 | Gabriel et al. |
| 2005/0086536 A1 | 4/2005 | Wu |
| 2006/0069668 A1 | 3/2006 | Braddy et al. |
| 2006/0080316 A1 | 4/2006 | Gilmore et al. |
| 2006/0224620 A1* | 10/2006 | Silverman .............. G11B 27/10 |
| 2006/0236408 A1 | 10/2006 | Yan |
| 2006/0265760 A1 | 11/2006 | Daemke et al. |
| 2007/0038765 A1* | 2/2007 | Dunn ................ G06F 21/6218 709/229 |
| 2007/0061327 A1* | 3/2007 | Oscherov ................ H04L 67/28 |
| 2007/0100834 A1* | 5/2007 | Landry .................. G06F 16/27 |
| 2007/0180504 A1 | 8/2007 | Hung |
| 2007/0203954 A1* | 8/2007 | Vargas ................ G06F 16/278 |
| 2007/0211047 A1 | 9/2007 | Doan et al. |
| 2007/0266257 A1 | 11/2007 | Camaisa et al. |
| 2008/0108427 A1 | 5/2008 | Freimuth et al. |
| 2008/0189757 A1 | 8/2008 | Schackow et al. |
| 2008/0226142 A1 | 9/2008 | Pennella et al. |
| 2008/0301760 A1 | 12/2008 | Lim |
| 2009/0037492 A1* | 2/2009 | Baitalmal .............. H04L 67/34 |
| 2009/0083847 A1 | 3/2009 | Fadell et al. |
| 2009/0112868 A1 | 4/2009 | Rajamani et al. |
| 2009/0217350 A1 | 8/2009 | Manning et al. |
| 2010/0125511 A1 | 5/2010 | Jouret et al. |
| 2010/0174912 A1* | 7/2010 | West ...................... G06F 21/31 713/183 |
| 2010/0223287 A1 | 9/2010 | Lim |
| 2010/0325686 A1 | 12/2010 | Davis et al. |
| 2011/0225640 A1 | 9/2011 | Ganapathy et al. |
| 2011/0276627 A1 | 11/2011 | Blechar et al. |
| 2011/0276897 A1 | 11/2011 | Crevier et al. |
| 2011/0302211 A1* | 12/2011 | Kilday ................ G06F 21/6218 707/785 |
| 2012/0023573 A1* | 1/2012 | Shi .......................... G06F 21/00 726/17 |
| 2012/0166983 A1 | 6/2012 | Demant et al. |
| 2012/0310880 A1 | 12/2012 | Giampaolo et al. |
| 2013/0014212 A1 | 1/2013 | Cohen |
| 2013/0055411 A1 | 2/2013 | Yang et al. |
| 2013/0067243 A1 | 3/2013 | Tamayo-Rios et al. |
| 2013/0067532 A1 | 3/2013 | Deakin et al. |
| 2013/0111592 A1 | 5/2013 | Zhu et al. |
| 2013/0132463 A1* | 5/2013 | Garcia-Ascanio .... G06F 16/178 709/203 |
| 2013/0174273 A1* | 7/2013 | Grab ...................... G06F 21/10 726/28 |
| 2013/0185774 A1 | 7/2013 | Morelli, Jr. |
| 2013/0219176 A1 | 8/2013 | Akella et al. |
| 2013/0219458 A1 | 8/2013 | Ramanathan |
| 2013/0254401 A1* | 9/2013 | Marshall ............... H04L 63/104 709/226 |
| 2013/0268999 A1* | 10/2013 | Kiang .................. H04L 29/0854 726/4 |
| 2013/0311894 A1* | 11/2013 | Rexer .................... G06Q 10/10 715/741 |
| 2014/0181909 A1 | 6/2014 | Birk et al. |
| 2015/0200948 A1* | 7/2015 | Cairns .................. H04L 9/3213 726/4 |

FOREIGN PATENT DOCUMENTS

| | | |
|---|---|---|
| WO | 03/009172 A2 | 1/2003 |
| WO | 2012/094330 A1 | 7/2012 |
| WO | 2013/016764 A1 | 2/2013 |
| WO | 2013/048110 A2 | 4/2013 |

* cited by examiner

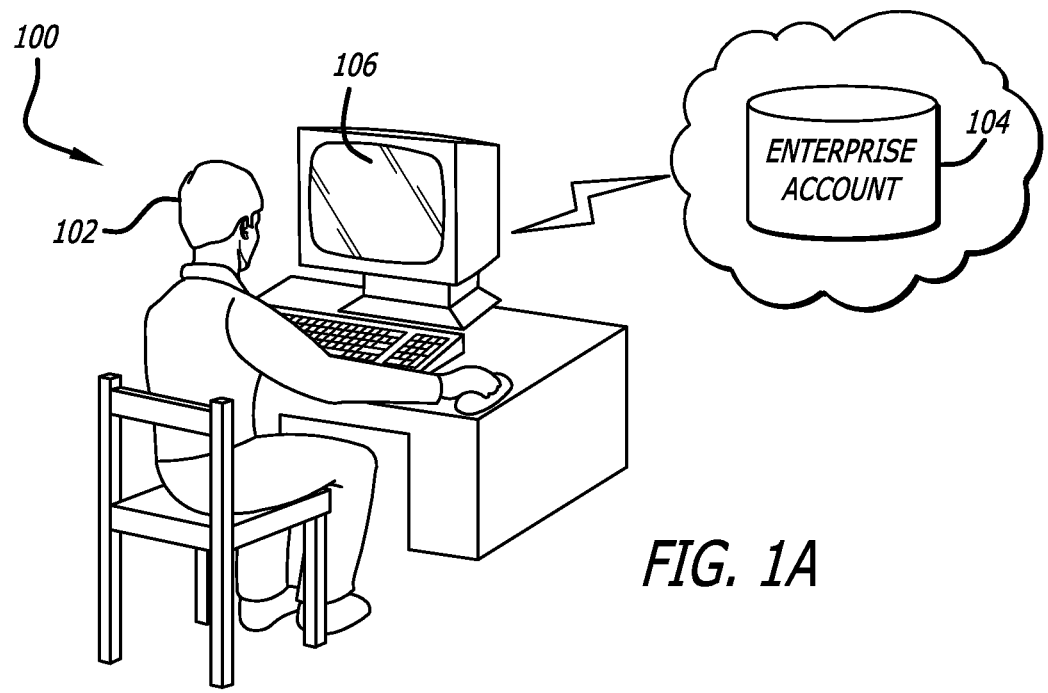
FIG. 1A
FIG. 1B
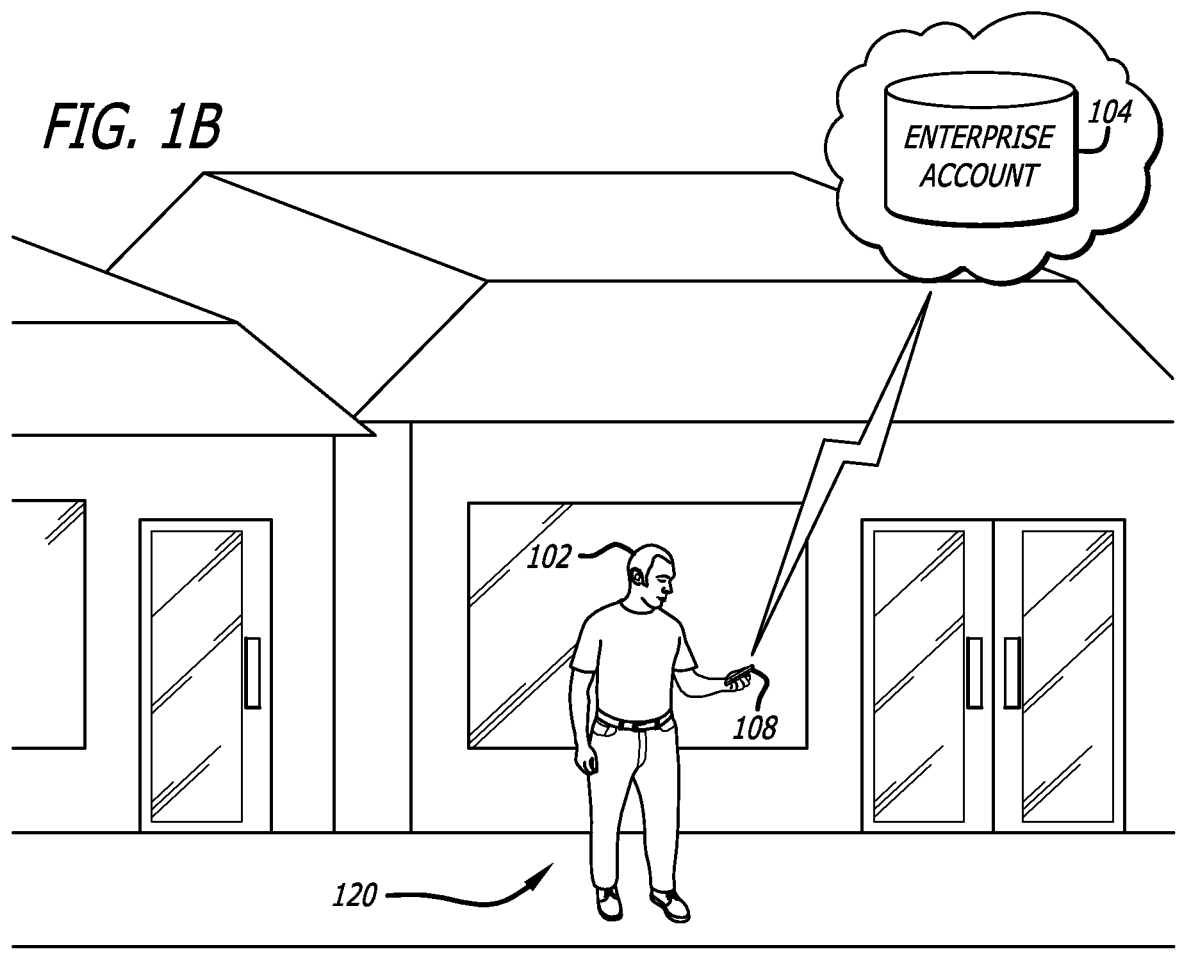

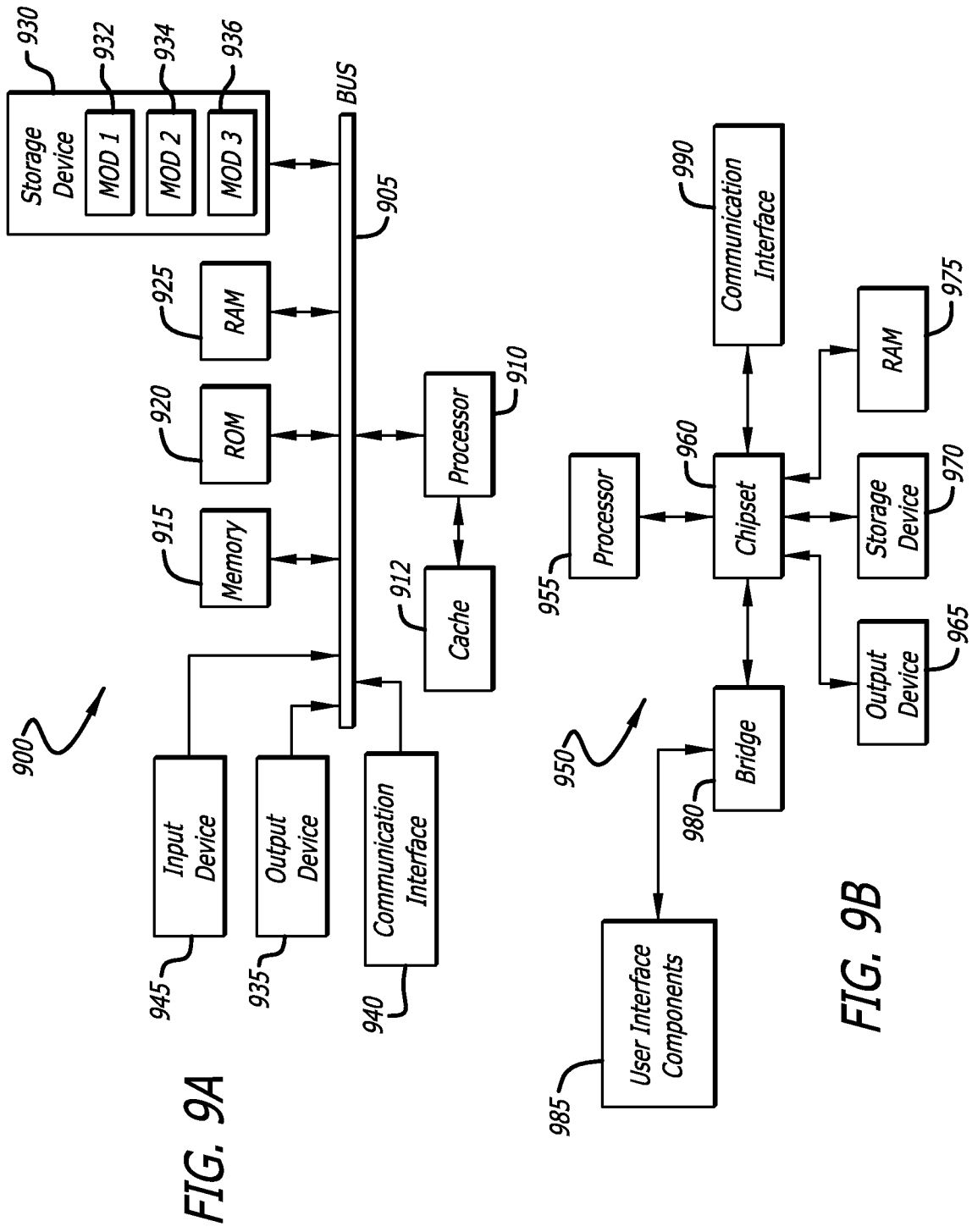

RESTRICTING ACCESS TO CONTENT

CROSS-REFERENCE TO RELATED APPLICATIONS

This application is a continuation of U.S. patent application Ser. No. 14/139,469, filed on Dec. 23, 2013, entitled, "RESTRICTING ACCESS TO CONTENT", now U.S. Pat. No. 9,817,987; which is hereby expressly incorporated herein by reference in its entirety

TECHNICAL FIELD

The present technology pertains to accessing content items, and more specifically pertains to restricting access to accounts based on application type, device type, a combination thereof, and the like.

BACKGROUND

Cloud storage accounts allow users to store content items in an online user account that can be accessed from any computing device with a network connection. This ease of access, however, presents a security challenge for various entities, such as enterprise or business accounts, who may be storing confidential or other sensitive information. For example, universal access could make it possible for a user to access their work account from "unauthorized" devices at home. Accordingly, an enterprise user can, therefore, access their work account using devices that their employer may not want them to access their account from (e.g., a personal computer). Accordingly, as people are increasingly relying on computing devices in a wider variety of ways, it can be advantageous to control the ways in which various devices are able to access such remotely accessible accounts.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for restricting or enabling access to particular content items, or an entire account, based on login information or content request properties. In at least one embodiment, an account can have one or more access rules or access configurations associated with it. For example, access rules can limit which types of client devices can be used to access an account through, for example, a web browser or a native client application executing on the client device, which can be used by an employer to restrict access to all devices except for devices that they issue or authorize.

For example, a synchronized online content management system can receive a request from a client device to access a user account. In this example, the request includes one or more content request properties specifying various aspects of the device. Access rules for the user account can be obtained and applied based on the content request properties to generate an access status. In one instance, the client device can be provided with full account access if the access status indicates that the client device is an authorized device (i.e., issued or authorized by the employer). In another instance, if the client device is an unauthorized device, at least one aspect of access to the user account is restricted, such as access to a subset of content stored in the user account.

In at least one embodiment, the access rules can be defined at different levels of granularity. For example, a rule can be applied to an entire user account, collections of content items (e.g., documents, presentations, etc.), or individual content items. A rule can specify a type of access (e.g., web browser, native client application, etc.), a client device type, an operating system type, a range of IP addresses, and the like. A rule can also specify a level of access permitted or prohibited, such as disable access entirely, enable read-only access, enable selective access, require admin's explicit approval, and the like.

The access rules can also be used to limit the applications that can access content items. For example, an employer may not want a user to use a competitor's application to access or modify a content item in an account. Accordingly, the rules can be based on whitelisting applications, blacklisting applications, requiring admin approval, and the like.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A, 1B, and 1C show a user accessing an account from multiple client devices in accordance with at least one embodiment;

FIG. 9A shows a conventional system bus computing system architecture; and

FIG. 9B shows a computer system having a chipset architecture.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for controlling the ways in which various devices are able to access remotely accessible accounts. For example, universal access makes it possible for a user (e.g., an enterprise user, business group user, etc.) to access their account from "unauthorized" devices, such as access their account using devices that their employer may not want them to use (e.g., a personal computer, etc.). Accordingly, this can present data security challenges.

Figure 1C:
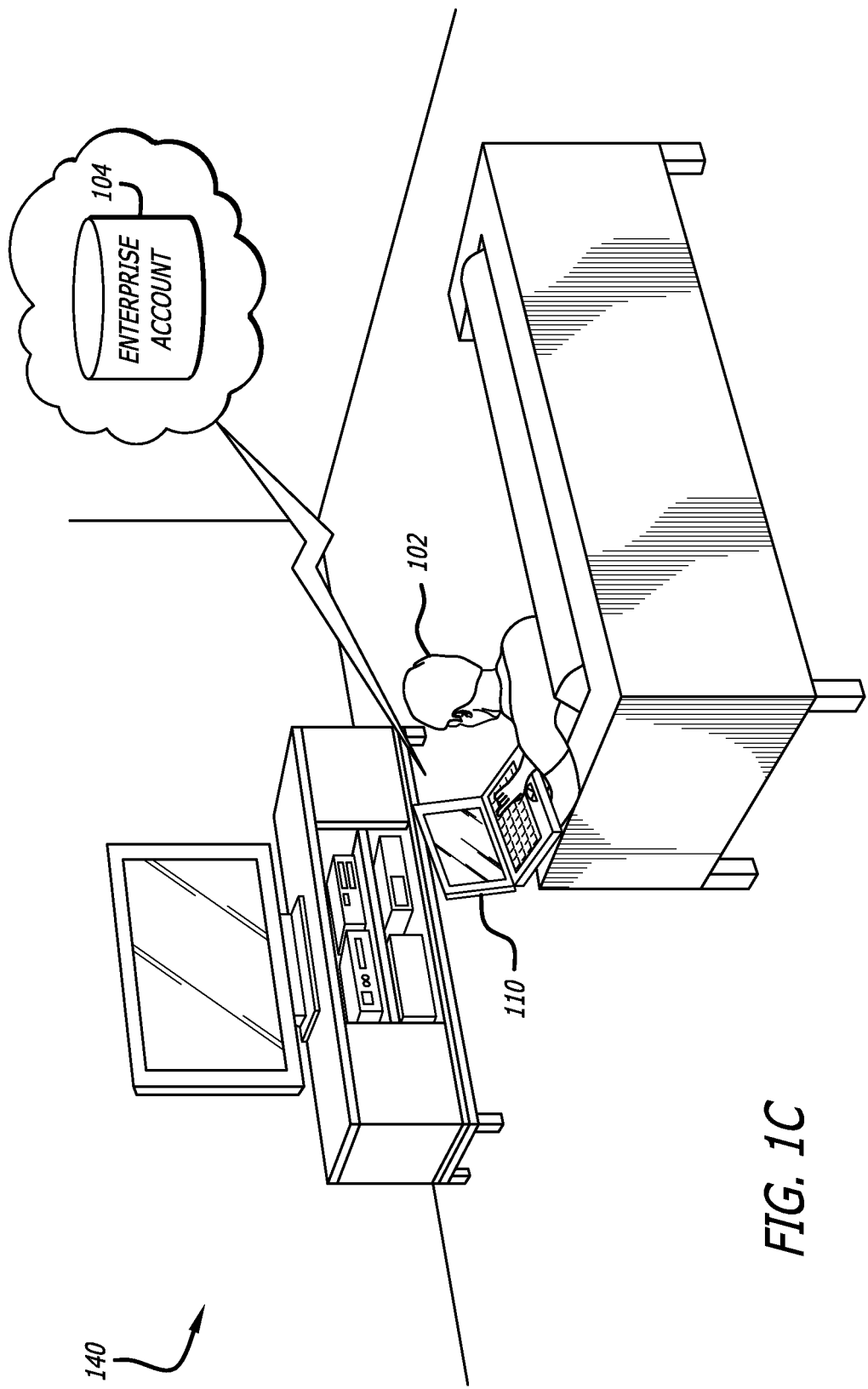

FIGS. 1A-1C show various situations where user 102 is accessing Enterprise Account 104 from multiple client devices. For example, FIG. 1A shows example situation 100 where user 102 is accessing Enterprise Account 104 from desktop client 106 while at work. FIG. 1B shows example situation 120 where user 102 is walking down the street and accessing Enterprise Account 104 from mobile client 106. FIG. 1C shows example situation 140 where user 102 is relaxing at home and accessing Enterprise Account 104 from laptop client 110. In this example, desktop client 106 could be a work computer; mobile client 108 could be a smartphone; and laptop client 110 could be a personal computer. Accordingly, desktop client 106 might be the only device that the user's employer wants them to access Enterprise Account 104 from, however, user 102 is able to access Enterprise Account 104 from not only desktop client 106, but also mobile client 108, and laptop client 110. As discussed above, this ease of access to potentially sensitive and confidential information can pose various data security issues ranging from theft to potentially exposing sensitive material to viruses. Accordingly, there is a need to control the ways in which devices, such as mobile client 108 and laptop client 110, are able to access a remotely accessible account, such as Enterprise Account 104.

Figure 2:
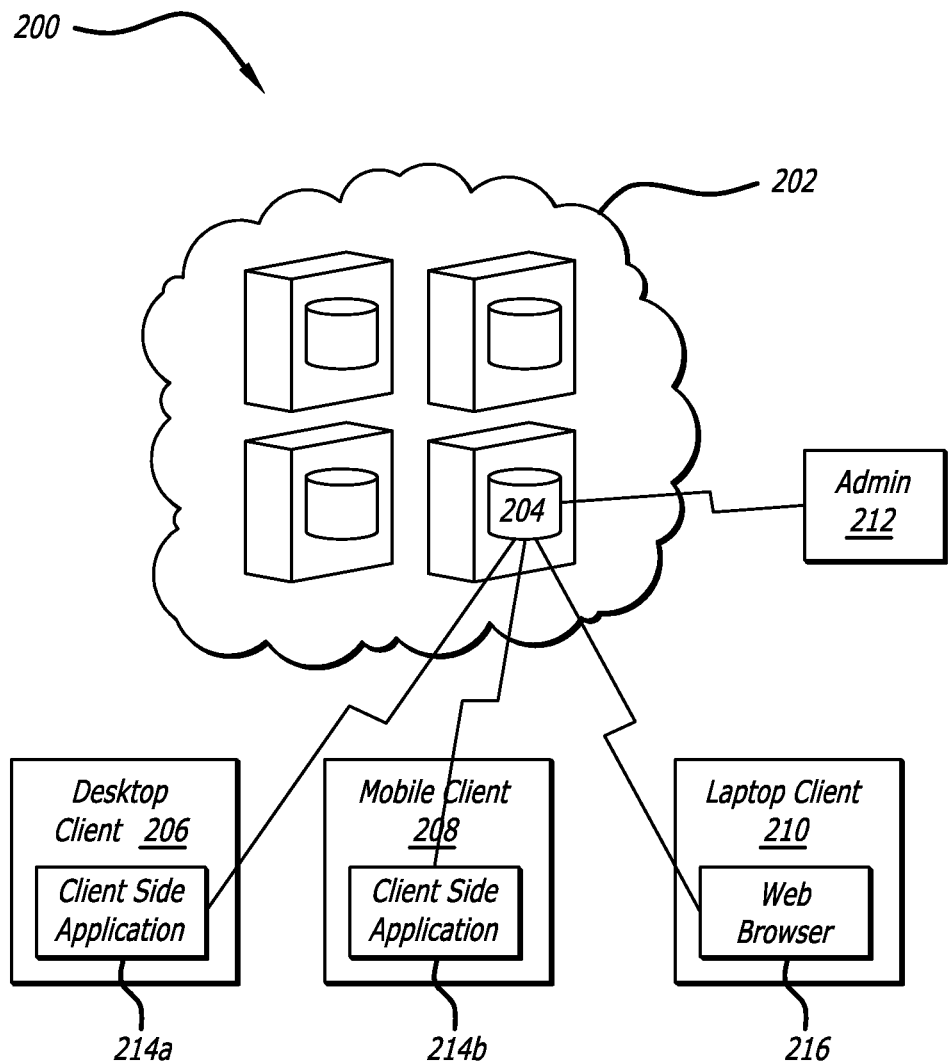
FIG. 2 shows an example environment in which at least one embodiment can be implemented.

FIG. 2 shows example environment 200 in which desktop client 206, mobile client 208, and laptop client 210, interact and communicate with account 204 located in synchronized online content management system 202 in a cloud computing environment in accordance with at least one embodiment. In at least one embodiment, desktop client 206 includes client-side or native application 214a and mobile client 208 includes a client-side application 214b that each communicates with synchronized online content management system 202 to synchronize content stored in account 204 locally on each of desktop client 206 and mobile client 208. In this example, laptop client 210 is not in communication with synchronized online content management system 202 through a client-side application, but a user can still access content stored in account 204 by logging into their account through web browser 216.

In at least one embodiment, administrator 212 can create access rules that govern access to content stored in account 204. For example, the access rules could specify that only a particular set of authorized client device types may access account 204 (e.g., only Apple® devices can have access, etc.). In another example, the access rules could specify a set of operating system types, a range of acceptable Internet Protocol (IP) addresses, applications authorized to access a respective content item, or the like.

Figure 3A:
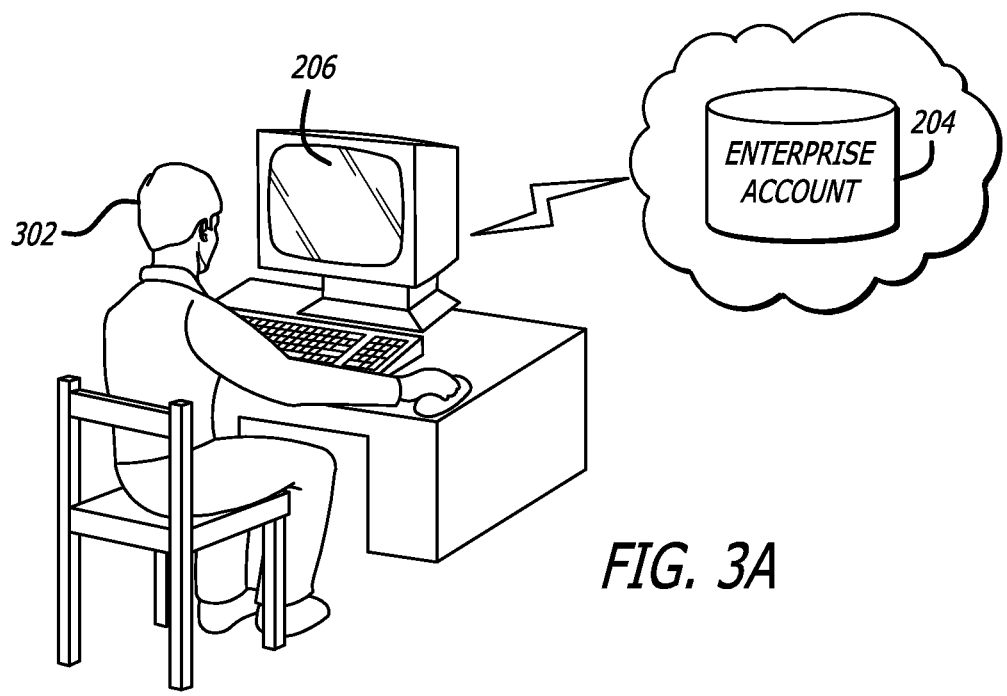
FIG. 3A shows a user accessing an account from a first client device in accordance with at least one embodiment.
Figure 3B:
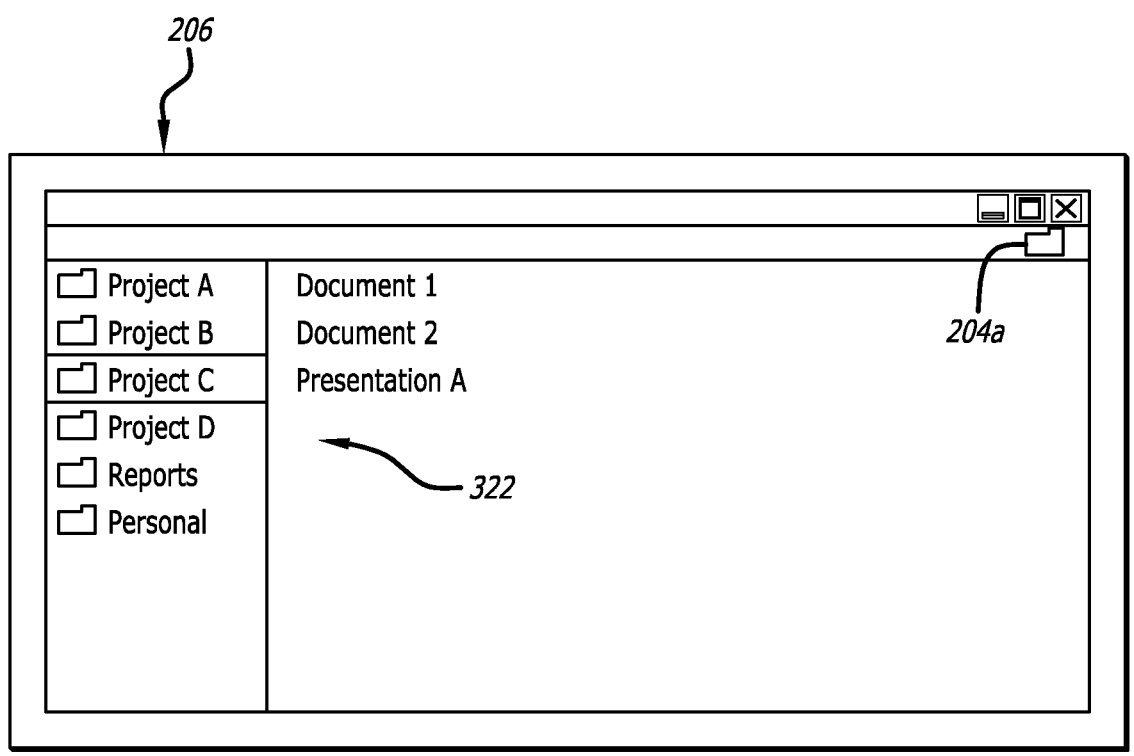
FIG. 3B shows example content of a user account as viewed from the first client device in accordance with at least one embodiment.

Further, administrator 212 may also apply various levels of access depending on various factors, such as some of those discussed above. In this example, the levels of access could enable full access of account 204. For example, work desktop client 206, as shown in FIG. 3A, could be provided with a highest level of access or full access since it is a computing device under direct control of and/or monitoring by administrator 212. Accordingly, FIG. 3B shows example content items 322 displayed by desktop client 306. In this example, each of content items 322 is accessible to user 302 as a result of the full access designation.

Figure 4A:
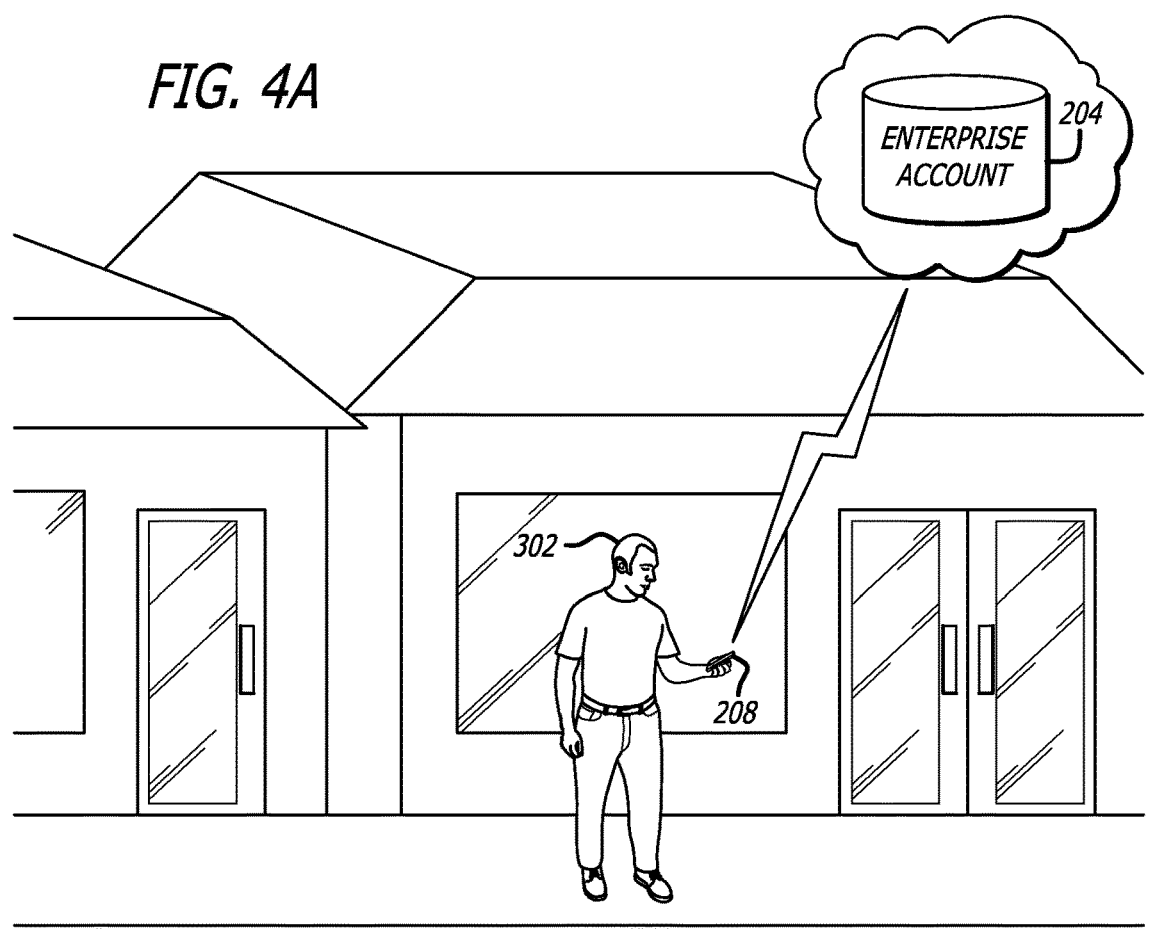
FIG. 4A shows the user accessing the account from a second client device in accordance with at least one embodiment.
Figure 4B:
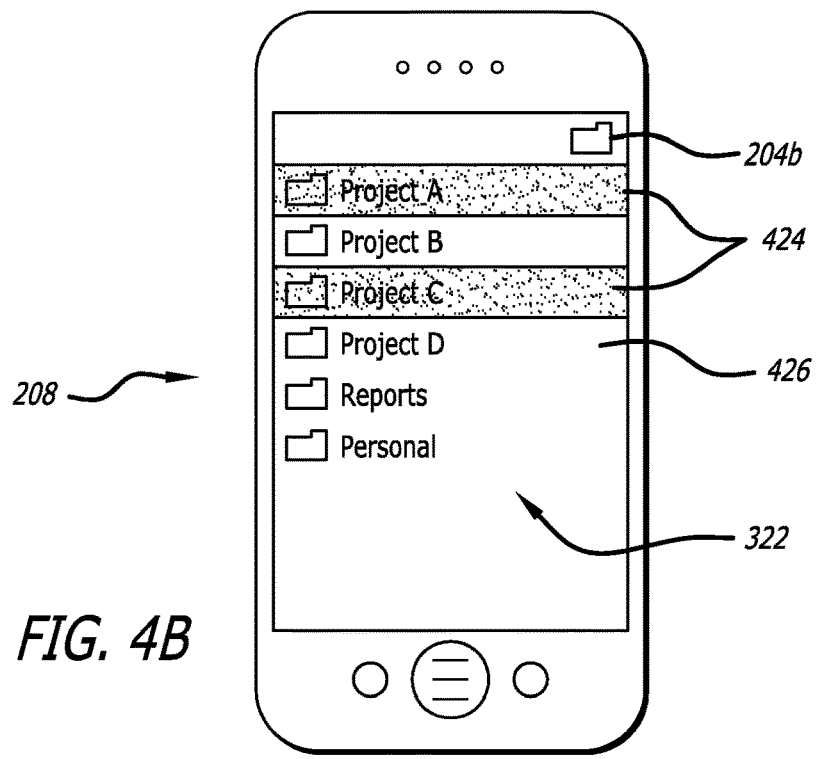
FIG. 4B shows example content of the user account as viewed from the second client device in accordance with at least one embodiment.

In at least one embodiment, administrator 212 may provide selective access to a subset of content items 322 stored in account 204, based on various factors discussed herein. For example, FIG. 4A shows user 302 walking down the street while accessing account 204 from mobile client 208. In this example, mobile client 208 could be a smartphone issued by the user's employer and, therefore, could be able to access a subset of content items 322. Since mobile devices can be more easily misplaced or stolen, administrator 208 may choose to enable a subset of content items 322, not all of them based on the sensitivity or confidentiality of the content in question, be accessible by mobile client 208. Accordingly, FIG. 4B shows example content items 322 displayed by mobile client 308. In this example, only a subset of content items 322 is accessible to user 302 via mobile client 208. For example, as a result of a confidentiality or sensitivity rating, working folders 424 containing Project A and Project C are unavailable to user 302 via mobile client 208, however, working folder 426 containing Project D, as well as the folders containing Project B, Reports, and Personal are available.

Figure 5A:
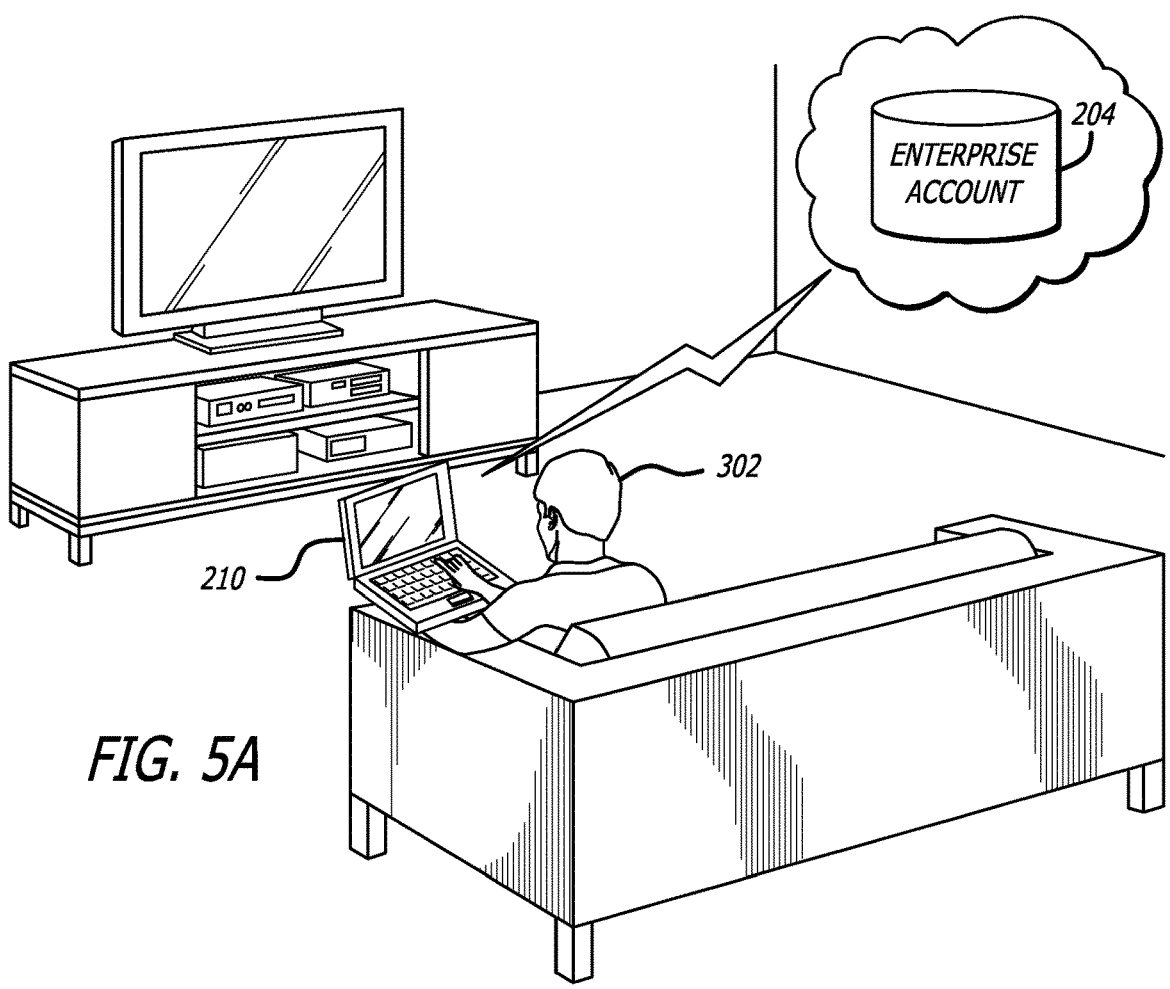
FIG. 5A shows the user accessing the account from a third client device in accordance with at least one embodiment.
Figure 5B:
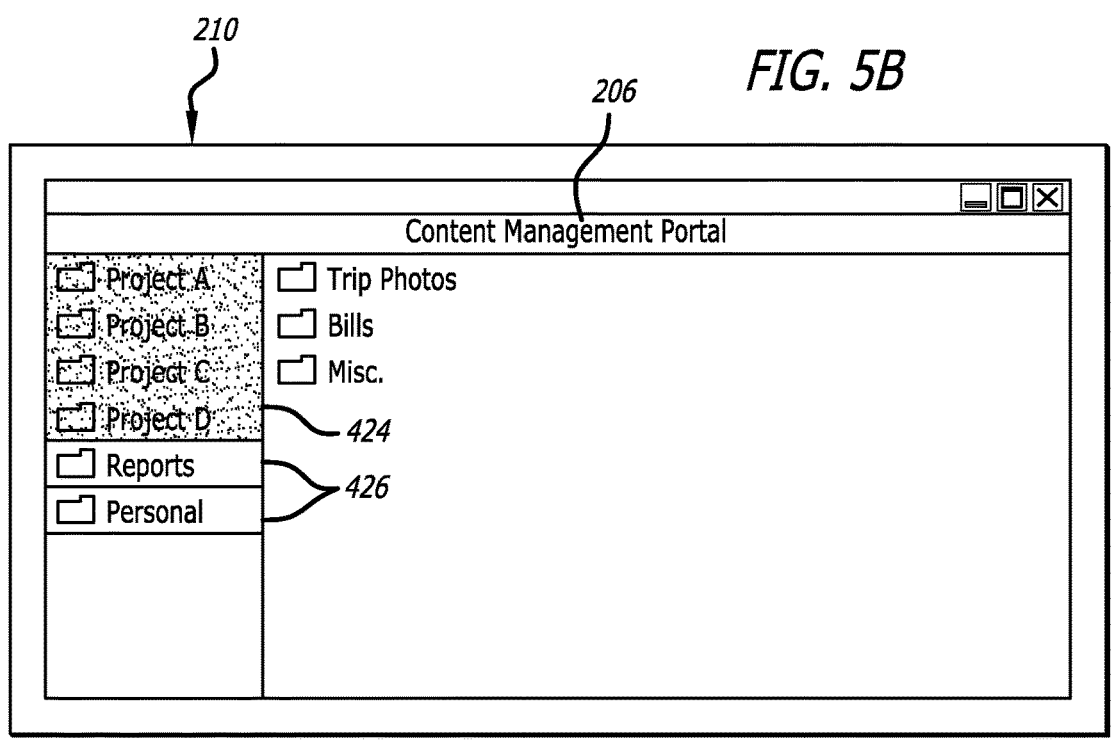
FIG. 5B shows example content of the user account as viewed from the third client device in accordance with at least one embodiment.

Accordingly, FIG. 5A shows user 302 relaxing at home while attempting to access content from account 204 from laptop client 210. In this example, laptop client 210 is a personal computer belonging to user 302. In this example, laptop client 210 is not an authorized device and the user's employer may not want him accessing account 204 with such an unauthorized device. An employer may not want this for many reasons, such as a result of security, potentially incompatible programs (e.g., whitelisting or blacklisting applications), etc. Accordingly, in this example, administrator 212 restricts access to working folders 424 from laptop client 210 entirely. Folders 426 corresponding to Reports and Personal, however, are available, in this example. Further, for situations where access to content items 322 is restricted, read-only access may be provided for a particular device, thereby, enabling user 302 to at least read or copy the content therein. In another example, a new device may be placed in a temporary holding state until it's hardware, software, credentials, etc. can be verified for administrative approval. Thus, upon being approved for use, user 302 could access at least a subset of content items 322 from a recently approved device.

Further, the access rules to restrict access can be applied in various locations. In at least one embodiment, client-side or native application 214a of desktop client 206 and client-side application 214b of mobile client 208 could apply the access rules locally on each respective client device. The client-side application running on the respective client device could prevent the respective device from synchronizing with synchronized online content management system 202 and, thereby, prevent a respective computing device from locally storing a restricted content item. In another example, the respective client-side application could prevent a restricted content item from opening. A particular content item may normally be accessible via a client device, so a locally stored copy of the particular content item exists, however, a particular access rule could prevent the particular content item from opening, for example, when the client device is accessing the internet from an unrecognized or unauthorized IP address.

In at least one embodiment, synchronized online content management system 202 could apply the access rules and impose them onto client-side application 214a and client-side application 214b. Further, the access rules could be applied by a combination of synchronized online content management system 202 and a respective client-side application. For example, global rules, such as which devices or operating systems can access a respective account, could be applied by synchronized online content management system 202 and local rules, such as restricting which IP addresses a client device can access from, could be applied locally by the respective client-side application executing on the requesting client device.

Figure 6:
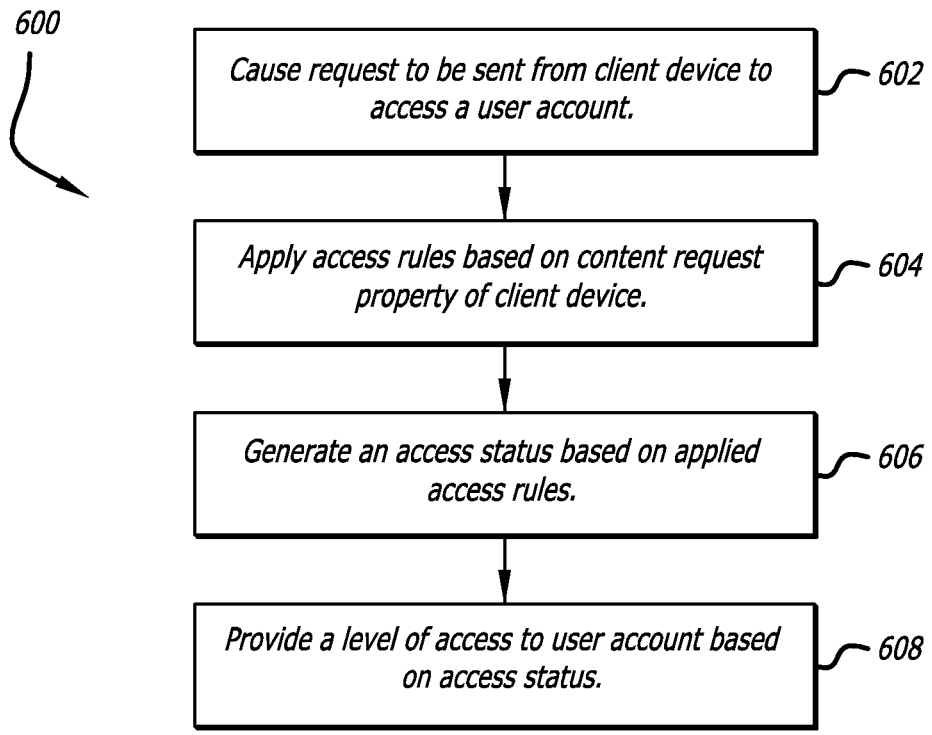
FIG. 6 shows an example process in accordance with at least one embodiment.

FIG. 6 shows an example process 600 for restricting or enabling access to content items based on client-side implemented access rules in accordance with various embodiments. It should be understood that, for any process discussed herein, there can be additional, fewer, or alternative steps performed in similar or alternative orders, or in parallel, within the scope of the various embodiments unless otherwise stated.

In this example, a request is sent from client device to access a user account stored with a synchronized online content management system 602. Access rules are applied based on one or more content request properties of client device 604. As used herein, a content request property may refer to the security status, access level status, the type of device, operating system, requesting application, various credentials, handshake key, metadata, tags, or the like associated with the requesting client device that can be used by the synchronized online content management system to determine a level a access for a respective computing or client device. In this example, an access status is generated based on the applied access rules 606. Based on the access status, a level of access is provided, thereby, enabling the level of access to user account 608.

Figure 7:
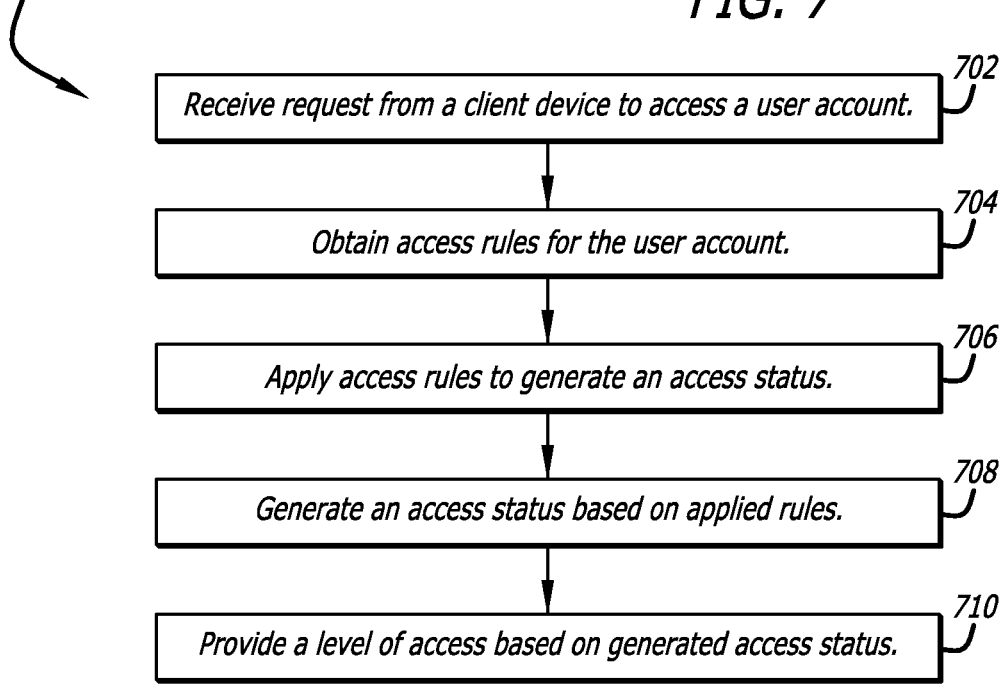
FIG. 7 shows an example process in accordance with at least one embodiment.

FIG. 7 shows an example process 700 for restricting or enabling access to content items based on server-side implemented access rules. In this example, a request from a client device to access a user account is received by a synchronized online content management system 702. The user account including content items that can be accessible by any authorized device through a network. In one example, each authorized device includes a client-side native application that communicates with the synchronized online content management system to synchronize a copy of each content item stored in the user account locally on each client device. Further, the account, depending on various restrictions may also be accessible by logging in to the account through a web browser. In this example, access rules for the user account are obtained 704. Accordingly, the access rules are applied to generate an access status 706. In this example, an access status is generated based on the applied rules 708. The level of access can include providing access to a subset of content items stored in the user account, read-only access, and the like discussed elsewhere herein. Accordingly, a level of access based on generated access status is provided 710. As used herein, the content items stored in the user account can include word processing documents, spreadsheets, presentations, videos, streaming contents, images, and the like.

Figure 8:
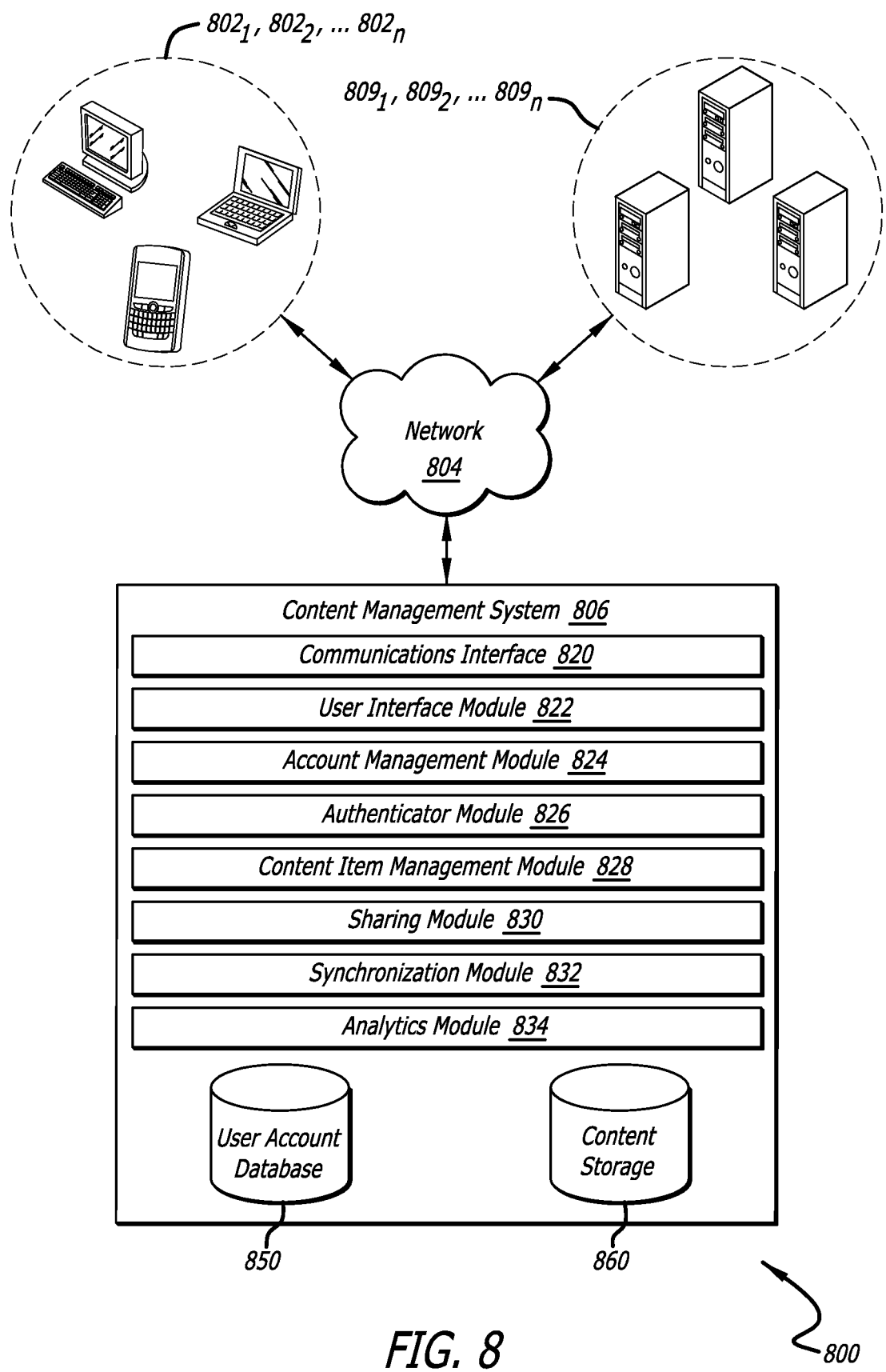
FIG. 8 shows an exemplary configuration of devices and a network in accordance with the invention.

An exemplary system configuration 800 for sharing content items is shown in FIG. 8, wherein client devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, a user can interact with content management system 806 through computing or client devices $802_1$, $802_2$, ..., $802_n$ (collectively "802") connected to network 804 by direct and/or indirect communication. Content management system 806 can support connections from a variety of different client devices, such as desktop computers; mobile computers; mobile communications devices, (e.g., mobile phones, smart phones, tablets; smart televisions; set-top boxes; and/or any other network enabled client devices, etc.). Client devices 802 can be of varying type, capabilities, operating systems, etc. Furthermore, content management system 806 can concurrently accept connections from and interact with multiple client devices 802.

A user can interact with content management system 806 via a client-side application installed on client device $802_i$. In some embodiments, the client-side application can include a content management system specific component. For example, the component can be a stand-alone application, one or more application plug-ins, and/or a browser extension. However, the user can also interact with content management system 806 via a third-party application, such as a web browser, that resides on client device $802_i$ and is configured to communicate with content management system 806. In either case, the client-side application can present a user interface (UI) for the user to interact with content management system 806. For example, the user can interact with the content management system 806 via a client-side application integrated with the file system or via a webpage displayed using a web browser application.

Content management system 806 can make it possible for a user to store content, as well as perform a variety of content management tasks, such as retrieve, modify, browse, and/or share the content. Furthermore, content management system 806 can make it possible for a user to access the content from multiple client devices 802. For example, client device $802_i$ can upload content to content management system 806 via network 804. The content can later be retrieved from content management system 806 using the same client device $802_i$ or some other client device $802_j$.

To facilitate the various content management services, a user can create an account with content management system 806. The account information can be maintained in user account database 850. User account database 850 can store profile information for registered users. In some cases, the only personal information in the user profile can be a username and/or email address. However, content management system 806 can also be configured to accept additional user information.

User account database 850 can also include account management information, such as account type, e.g. free or paid; usage information, e.g. file edit history; maximum storage space authorized; storage space used; content storage locations; security settings; personal configuration settings; content sharing data; etc. Account management module 824 can be configured to update and/or obtain user account details in user account database 850. The account management module 824 can be configured to interact with any number of other modules in content management system 806.

An account can be used to store content, such as digital data, documents, text files, audio files, video files, etc., from one or more client devices 802 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from client devices 802 so that client devices 802 do not need to know exactly where the content items are being stored by content management system 806. In one variation, content management system 806 can store the content items in the same folder hierarchy as they appear on client device $802_i$. However, content management system 806 can store the content items in its own order, arrangement, or hierarchy. Content management system 806 can store the content items in a network accessible storage (SAN) device, in a redundant array of inexpensive disks (RAID), etc. Content storage 860 can store content items using one or more partition types, such as FAT, FAT32, NTFS, EXT2, EXT3, EXT4, ReiserFS, BTRFS, and so forth.

Content storage 860 can also store metadata describing content items, content item types, and the relationship of content items to various accounts, folders, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate files or duplicate segments of files. Instead of storing multiple copies, content storage 860 can store a single copy and then use a pointer or other mechanism to link the duplicates to the single copy. Similarly, content storage 860 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 806 can be configured to support automatic synchronization of content from one or more client devices 802. The synchronization can be platform agnostic. That is, the content can be synchronized across multiple client devices 802 of varying type, capabilities, operating systems, etc. For example, client device $802_i$ can include client software, which synchronizes, via a synchronization module 832 at content management system 806, content in client device $802_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 806. Conversely, the background process can identify content that has been updated at content management system 806 and synchronize those changes to the local folder. The client software can provide notifications of synchronization operations, and can provide indications of content statuses directly within the content management application. Sometimes client device $802_i$ may not have a network connection available. In this scenario, the client software can monitor the linked folder for file changes and queue those changes for later synchronization to content management system 806 when a network connection is available. Similarly, a user can manually stop or pause synchronization with content management system 806.

A user can also view or manipulate content via a web interface generated and served by user interface module 822. For example, the user can navigate in a web browser to a web address provided by content management system 806. Changes or updates to content in the content storage 860 made through the web interface, such as uploading a new version of a file, can be propagated back to other client devices 802 associated with the user's account. For example, multiple client devices 802, each with their own client software, can be associated with a single account and files in the account can be synchronized between each of the multiple client devices 802.

Content management system 806 can include a communications interface 820 for interfacing with various client devices 802, and can interact with other content and/or service providers $809_1$, $809_2$, ..., $809_n$ (collectively "809") via an Application Programming Interface (API). Certain software applications can access content storage 860 via an API on behalf of a user. For example, a software package, such as an app on a smartphone or tablet client device, can programmatically make calls directly to content management system 806, when a user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific client devices, and so forth, to ensure only authorized clients and users can access files. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any client device in network communication with content management system 806. Sharing content privately can include linking a content item in content storage 860 with two or more user accounts so that each user account has access to the content item. The sharing can be performed in a platform agnostic manner. That is, the content can be shared across multiple client devices 802 of varying type, capabilities, operating systems, etc. The content can also be shared across varying types of user accounts.

In some embodiments, content management system 806 can include a content item management module 828 for maintaining a content directory. The content directory can identify the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 6 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 6 or true. Thus, access to a content item for which a URL has been generated can be easily restricted by changing the value of the URL active flag. This allows a user to restrict access to the shared content item without having to move the content item or delete the generated URL. Likewise, sharing module 830 can reactivate the URL by again changing the value of the URL active flag to 6 or true. A user can thus easily restore access to the content item without the need to generate a new URL.

While content management system 806 is presented with specific components, it should be understood by one skilled in the art, that the architectural configuration of system 806 is simply one possible configuration and that other configurations with more or less components are also possible.

FIG. 9A, and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, at a content management system from an application stored on a client device that is authorized to access a user account of the content management system, a request to access content items stored on the client device, wherein the content items are stored on the client device by virtue of the user account having permissions in an access control list at the content management system to access the content items;

in response to the request, obtaining one or more access rules for the content items associated with the user account, wherein the one or more access rules define access restrictions for the content items stored on the client device by the application stored on the client device;

wherein the application on the client device is configured to grant access to a first subset of the content items stored on the client device based on the client device comprising a first subset of device characteristics as required in the one or more access rules for the first subset of the content items, and wherein the application is configured to deny access to a second subset of the content items stored on the client device based on the client device comprising a second subset of device characteristics as required in the one or more access rules for the second subset of the content items.

2. The computer-implemented method of claim 1, further comprising determining an application type of the application stored on the client device, wherein the device characteristics comprise the application type of the application stored on the client device, the one or more access rules provide a different access level based on the determined application type.

3. The computer-implemented method of claim 1, further comprising determining a client device type of the client device that stores the application, wherein the device characteristics comprise the client device type of the client device that stores the application, the one or more access rules provide a different access level based on the determined device type.

4. The computer-implemented method of claim 1, wherein the one or more access rules comprise at least one of read access or write access based on an application type or a device type, and the user account is authorized to at least one of the read access or the write access.

5. The computer-implemented method of claim 1, wherein the device characteristics comprise an IP address used to make the request, the one or more access rules are based on the IP address used to make the request.

6. The computer-implemented method of claim 1, further comprising transmitting, from the content management system to the client device, access status information based on the one or more access rules for the content items.

7. A computer-implemented method comprising:
receiving, at a content management system from an application stored on a client device authorized to access a user account on the content management system, a request to access content items stored on the client device by virtue of the user account having permissions in an access control list at the content management system to access the content items;

in response to the request, obtaining one or more access rules for the content items associated with the user account, wherein the one or more access rules define access restrictions for the content items by the application stored on the client device; and applying the one or more access rules for each content item, wherein access is granted to a first subset of the content items stored on the client device based on the client device comprising a first subset of device characteristics as required in the one or more access rules for the first subset of the content items, and wherein access is denied to a second subset of the content items stored on the client device based on the client device comprising a second subset of device characteristics as required in the one or more access rules for the second subset of the content items.

8. The computer-implemented method of claim 7, further comprising determining an application type of the application stored on the client device, wherein the one or more access rules provide a different access level based on the determined application type.

9. The computer-implemented method of claim 7, further comprising determining a client device type of the client device that stores the application, wherein the one or more access rules provide a different access level based on the determined device type.

10. The computer-implemented method of claim 7, wherein the one or more access rules comprise at least one of read access or write access based on an application type or a device type.

11. The computer-implemented method of claim 7, wherein the one or more access rules are based on an IP address used to make the request.

12. A computer-implemented method comprising:
sending, to a content management system from an application stored on a client device authorized to access a user account of the content management system, a request to access content items stored on the client device, wherein the content items are stored on the client device by virtue of the user account having permissions in an access control list at the content management system to access the content items, and wherein the application is authorized to access the content items when the client device is associated with at least one context;

synchronizing, by the application stored on the client device, the content items associated with the user account of the content management system, wherein the synchronizing includes downloading one or more access rules for the content items associated with the user account, and wherein the one or more access rules define access restrictions for the content items by the application stored on the client device;

applying, by the application stored on the client device, the one or more access rules to determine a first subset of the content items stored on the client device based on the client device comprising a first subset of device characteristics as required in the one or more access rules associated with the first subset of the content items and a second subset of the content items stored on the client device based on the client device comprising a second subset of device characteristics as required in the one or more access rules associated with the second subset of the content items;

presenting, via the application stored on the client device, a representation of the content items associated with the user account; and in response to a request to access a content item from the content items associated with the user account through the application stored on the client device, allowing access to the first subset of the content items and restricting access to the second subset of the content items.

13. The computer-implemented method of claim 12, further comprising determining an application type of the application stored on the client device, wherein the one or more access rules define different access levels for different operating system types.

14. The computer-implemented method of claim 12, further comprising determining a client device type of the client device that stores the application, wherein the one or more access rules provide a different access level based on the determined device type.

15. The computer-implemented method of claim 12, wherein the one or more access rules comprise at least one of read access or write access based on an application type or a device type.

16. The computer-implemented method of claim 12, wherein the one or more access rules are based on an IP address used to make the request.

17. The computer-implemented method of claim 12, wherein the at least one context further includes a type of the client device.

18. A computer-implemented method comprising:
   sending, to a content management system from an application stored on a client device authorized to access a user account on the content management system, a request to access content items stored on the client device, wherein the content items are stored on the client device by virtue of the user account having permissions in an access control list at the content management system to access the content items, and wherein the application is authorized to access each of the content items when one or more access rules for each of the content items are met;
   synchronizing between the application stored on the client device and the content management system the content items associated with the user account, wherein access to the content items are based on the one or more access rules defining a first subset of the content items stored on the client device based on the client device comprising a first subset of device characteristics as required in the one or more access rules associated with the first subset of the content items and a second subset of the content items stored on the client device based on the client device comprising a second subset of device characteristics as required in the one or more access rules associated with the second subset of the content items;
   presenting, via the application stored on the client device, a representation of the content items associated with the user account; and
   allowing access to the first subset of the content items.

19. The computer-implemented method of claim 18, further comprising determining an application type of the application stored on the client device, wherein the one or more access rules provide a different access level based on the determined application type.

20. The computer-implemented method of claim 18, further comprising determining a client device type of the client device that stores the application, wherein the one or more access rules provide a different access level based on the determined device type.

21. The computer-implemented method of claim 18, wherein the one or more access rules comprise at least one of read access or write access based on an application type or a device type.

22. The computer-implemented method of claim 18, wherein the one or more access rules are based on an IP address used to make the request.

\* \* \* \* \*